United States Patent
Chkodrov et al.

(10) Patent No.: US 7,627,544 B2
(45) Date of Patent: Dec. 1, 2009

(54) RECOGNIZING EVENT PATTERNS FROM EVENT STREAMS

(75) Inventors: Gueorgui B. Chkodrov, Redmond, WA (US); Vijay Mital, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 144 days.

(21) Appl. No.: 11/133,701

(22) Filed: May 20, 2005

(65) Prior Publication Data

US 2006/0265406 A1  Nov. 23, 2006

(51) Int. Cl.
G06N 5/02 (2006.01)
(52) U.S. Cl. .................. 706/48; 703/17; 726/22
(58) Field of Classification Search .......... 706/46; 707/202; 726/4, 22
See application file for complete search history.

(56) References Cited

U.S. PATENT DOCUMENTS

| | | | |
|---|---|---|---|
| 5,276,873 A | 1/1994 | Peters | |
| 5,634,127 A | 5/1997 | Cloud et al. | |
| 5,794,053 A | 8/1998 | Doris et al. | |
| 5,891,046 A | 4/1999 | Cyrus et al. | |
| 6,411,961 B1 | 6/2002 | Chen | |
| 6,662,188 B1 | 12/2003 | Rasmussen et al. | |
| 6,697,810 B2 | 2/2004 | Kumar et al. | |
| 6,708,186 B1 | 3/2004 | Claborn et al. | |
| 6,895,438 B1 | 5/2005 | Ulrich | |
| 6,898,790 B1 | 5/2005 | Cheong et al. | |
| 7,233,952 B1 | 6/2007 | Chen | |
| 2002/0059183 A1 | 5/2002 | Chen | |
| 2002/0062237 A1 | 5/2002 | Matsumoto et al. | |
| 2002/0138316 A1 | 9/2002 | Katz et al. | |
| 2002/0147622 A1 | 10/2002 | Drolet et al. | |
| 2003/0018643 A1 | 1/2003 | Mi et al. | |
| 2003/0033180 A1 | 2/2003 | Shekar et al. | |
| 2003/0084127 A1 | 5/2003 | Budhiraja et al. | |
| 2003/0208392 A1 | 11/2003 | Shekar et al. | |
| 2003/0225820 A1 | 12/2003 | Chkodrov et al. | |
| 2004/0078464 A1 | 4/2004 | Rajan et al. | |
| 2004/0098358 A1 | 5/2004 | Roediger | |
| 2004/0153329 A1 | 8/2004 | Casati et al. | |

(Continued)

OTHER PUBLICATIONS

Kalen Delaney, Inside Microsoft SQL Server 2000, Chapter 8—Indexes, pp. 405-415, and Chapter 15—The Query Processor, pp. 841-844, published by Microsoft Press, Redmond, Washington, Copyright 2001.

(Continued)

*Primary Examiner*—David R Vincent
*Assistant Examiner*—Kalpana Bharadwaj
(74) *Attorney, Agent, or Firm*—Senniger Powers

(57) ABSTRACT

System and method for identifying a pattern. A method of the invention compiles a pattern description where the pattern description defines a series of a first event and a second event relating to the first event. The first event is received and includes a type parameter data, a time parameter data, and a substance parameter data. A system of the invention includes a script component for associating or attaching a first script to the first event. The first script defines the type, time, and substance parameters of the second event as a function of the parameters of the first event according to the pattern description. A pattern recognition engine executes the attached first script and the executed script identifies the second event and thereby identifies the pattern.

20 Claims, 13 Drawing Sheets

U.S. PATENT DOCUMENTS

| | | |
|---|---|---|
| 2004/0158429 A1 | 8/2004 | Bary et al. |
| 2004/0172409 A1* | 9/2004 | James .................... 707/104.1 |
| 2004/0220910 A1 | 11/2004 | Zang et al. |
| 2005/0021348 A1 | 1/2005 | Chan et al. |
| 2005/0071320 A1 | 3/2005 | Chkodrov et al. |
| 2005/0071347 A1 | 3/2005 | Chau et al. |
| 2005/0086584 A1* | 4/2005 | Sampathkumar et al. . 715/501.1 |
| 2005/0102185 A1 | 5/2005 | Barket et al. |
| 2005/0154628 A1 | 7/2005 | Eckart et al. |
| 2005/0216482 A1 | 9/2005 | Ponessa |
| 2006/0053120 A1 | 3/2006 | Shum et al. |
| 2006/0085473 A1 | 4/2006 | Thormaehlen et al. |
| 2006/0122872 A1 | 6/2006 | Stevens et al. |
| 2006/0143034 A1 | 6/2006 | Rothermel et al. |
| 2006/0173668 A1* | 8/2006 | Haigh et al. .................. 703/17 |
| 2006/0177058 A1* | 8/2006 | Sarwono et al. ............. 380/211 |
| 2006/0235907 A1 | 10/2006 | Kathuria et al. |
| 2007/0107052 A1 | 5/2007 | Cangini et al. |

OTHER PUBLICATIONS

Pivk, Aleksander, "Intelligent Agents In E-Commerce," Electronic Review Slovenia, Pub 2000, 18 pages.

Schiefer, J. et al., "Process information factory: a data management approach for enhancing business process intelligence," Published Jul. 6-9, 2004, IEEE.

* cited by examiner

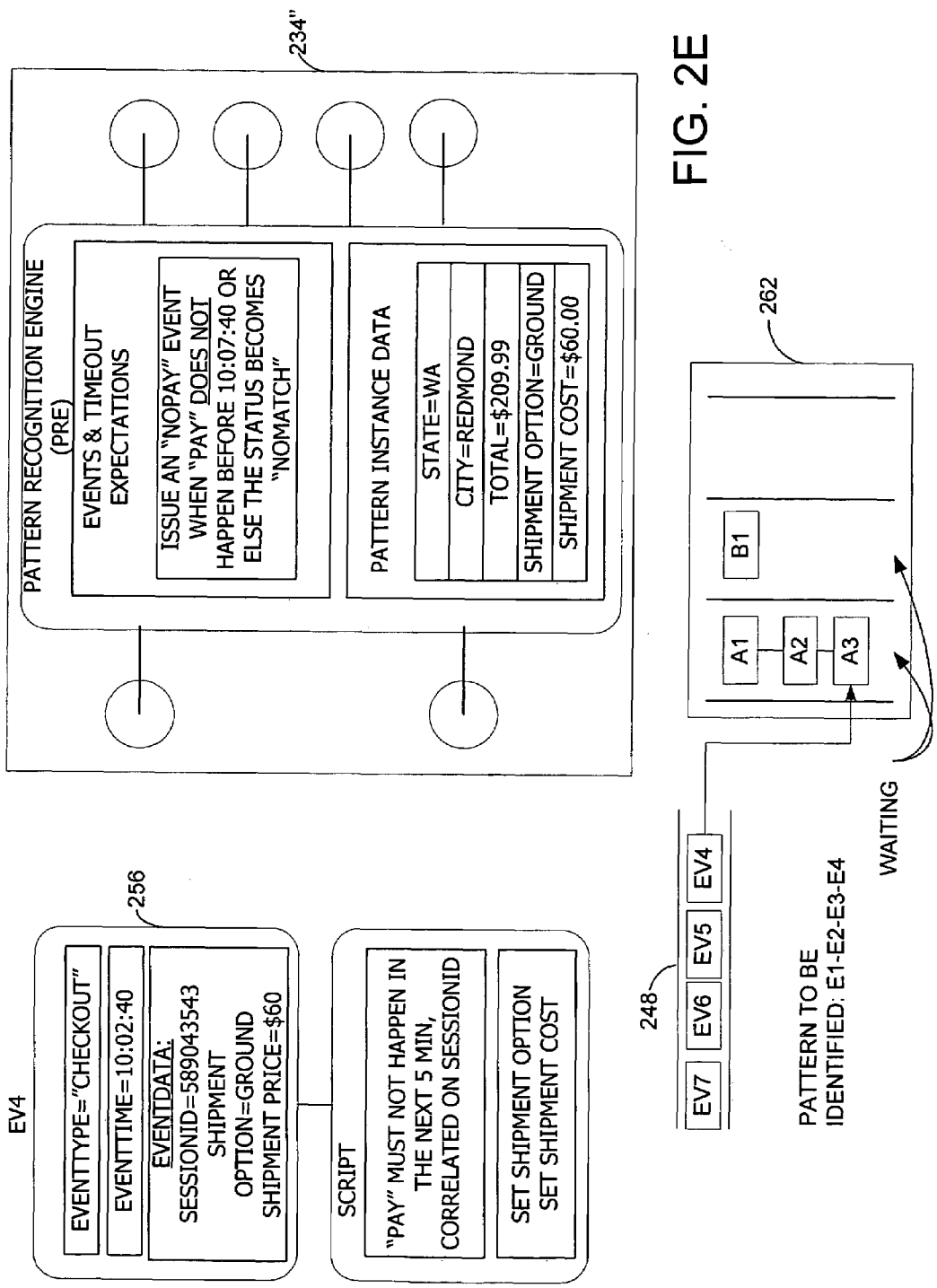

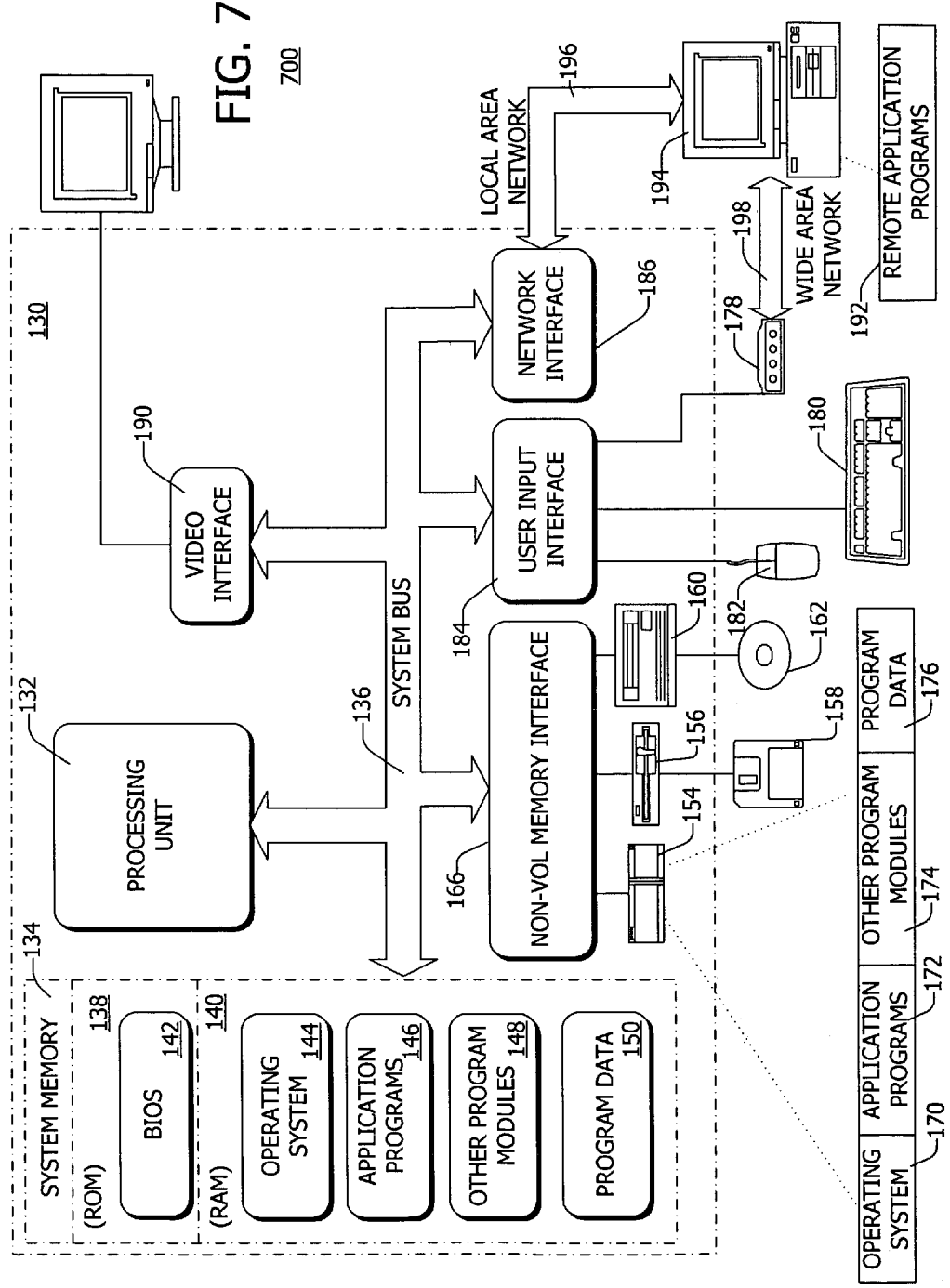

RECOGNIZING EVENT PATTERNS FROM EVENT STREAMS

TECHNICAL FIELD

Embodiments of the present invention relate to the field of event stream processing. In particular, embodiments of this invention relate to identifying a pattern in a plurality of events.

BACKGROUND OF THE INVENTION

Business enterprises use computer systems with applications to monitor and process business activities and transactions. For example, an online store selling purses may use a business application to receive online sales orders, an inventory application to manage the purses in the inventory and communicate with the supplier, or other applications or services to create online interfaces. Business entities handling complex transactions and activities may employ distributed computer systems. For example, financial institutions which handle credit card and ATM transactions may receive thousands of transactions every ten minutes.

Each of the various activities or transactions may be treated as a single event by business applications or software. For example, in the online purse boutique store, a user login session may be treated as an event and a consumer swiping her credit card at a shopping mall may be treated as another event by the financial institutions. While each single event may be significant, analysis of each single event may not be beneficial. Instead, business entities or other organizations may be interested in occurrences of multiple events according to a specific pattern. Such accumulated information from the specific pattern represents a "higher level event" and is beneficial and meaningful for further analysis.

For example, single events, such as a user's login session of an online store, placing an item in her shopping cart, or the like may be trivial. However, the online store may be interested in a specific pattern of (1) user login, (2) place item to the shopping cart, (3) proceed to check out, and (4) no further action from the user. Such pattern may indicate that the user has abandoned her shopping cart because (a) she is not pleased with the shipping and handling charges, (b) she decides to compare prices of the item before purchasing, (c) the user clicks the "Purchase" button, but the handling server did not receive the request, or other reasons.

Current systems process events and attempt to match events to particular interested patterns. For example, in identifying the "abandoning of the shopping cart" pattern, the online store may design an application to identify a given sequence of events, such as (1) user login, (2) shopping cart update, (3) checkout, and followed by no action from the user in the next ten minutes. However, such pattern matching requires the online store to ask a software programmer to customize the application to handle the "abandoning of the shopping cart" pattern. In other systems, pattern matching is accomplished as a hindsight process by performing analysis during offline period and/or only after data from events is stored in a database or data warehouse.

These systems lack generic pattern recognition implementation to efficiently identify any given patterns from a series of events. In addition, customized codes or routines require existing systems to process correlation of event data and evaluation of patterns together. For example, in identifying a pattern, the existing systems wait for the occurrences of events to correlate data from events before determining whether a pattern has occurred. When a new pattern is to be evaluated, a new set of customized routines are needed to configure the existing system to evaluate the pattern.

Accordingly, a system and method for identifying a pattern in a plurality of events by monitoring incoming events and correlating monitored events are desired to address one or more of these and other disadvantages and shortcomings.

SUMMARY OF THE INVENTION

Embodiments of the present invention overcome shortcomings of the known systems by compiling a pattern description to define a series of events. A script or a set of executable code is attached or associated with each event and the script defines data parameters to correlate the events according to the pattern description. Embodiments of the invention execute script of each event to determine whether the event matches a particular pattern.

According to one aspect of the invention, a method identifies a pattern in a series of events. The method compiles a pattern description. The pattern description defines a series of a first event and a second event relating to the first event. The first event is received, and the first event includes a type parameter data, a time parameter data, and a substance parameter data. The method also attaches a first script to the first event. The first script defines type, time and substance parameters of the second event as a function of the parameters of the first event according to the pattern description. The attached first script of the first event is executed. The executed script identifies the second event and thereby identifies the pattern.

According to another aspect of the invention, one or more computer-readable media having computer-executable components identify event patterns. A pattern compiling component compiles a plurality of pattern descriptions. Each of the pattern descriptions defines a series of events in a sequence. An event component collects a plurality of events. Each of the plurality of events has data parameters relating to each of the plurality of events. A script component associates a script to each of the plurality of events. The script defines data parameters of a subsequent event in the series of each of the plurality of events according to the pattern description of each of the plurality of events. A pattern recognition engine executes the script of each of the plurality of events to identify the subsequent event in the series and thereby identify the pattern.

In accordance with a further aspect of the invention, a system identifies a pattern in a plurality of events. A plurality of collecting computers collects related events as a series of pattern events. A first set of computers identifies a first portion of the pattern in each collected series. Each of the collected series matches the first portion of the series of pattern events. A second set of computers identifies a second portion of the pattern in each series in which the first portion of the pattern has been identified by the first set. The first portion of the pattern and the second portion of the pattern match the series of pattern events. Each series of events including the first and second portions of the pattern is accumulated and stored for evaluation.

Alternatively, the invention may comprise various other methods and apparatuses.

Other features will be in part apparent and in part pointed out hereinafter.

BRIEF DESCRIPTION OF THE DRAWINGS

FIGS. 2A-2F are diagrams illustrating an instance of a pattern recognition engine in the process of executing a script associated with an event according to one embodiment of the invention.

FIG. 7 is a block diagram illustrating one example of a suitable computing system environment in which the invention may be implemented.

Figure 1:
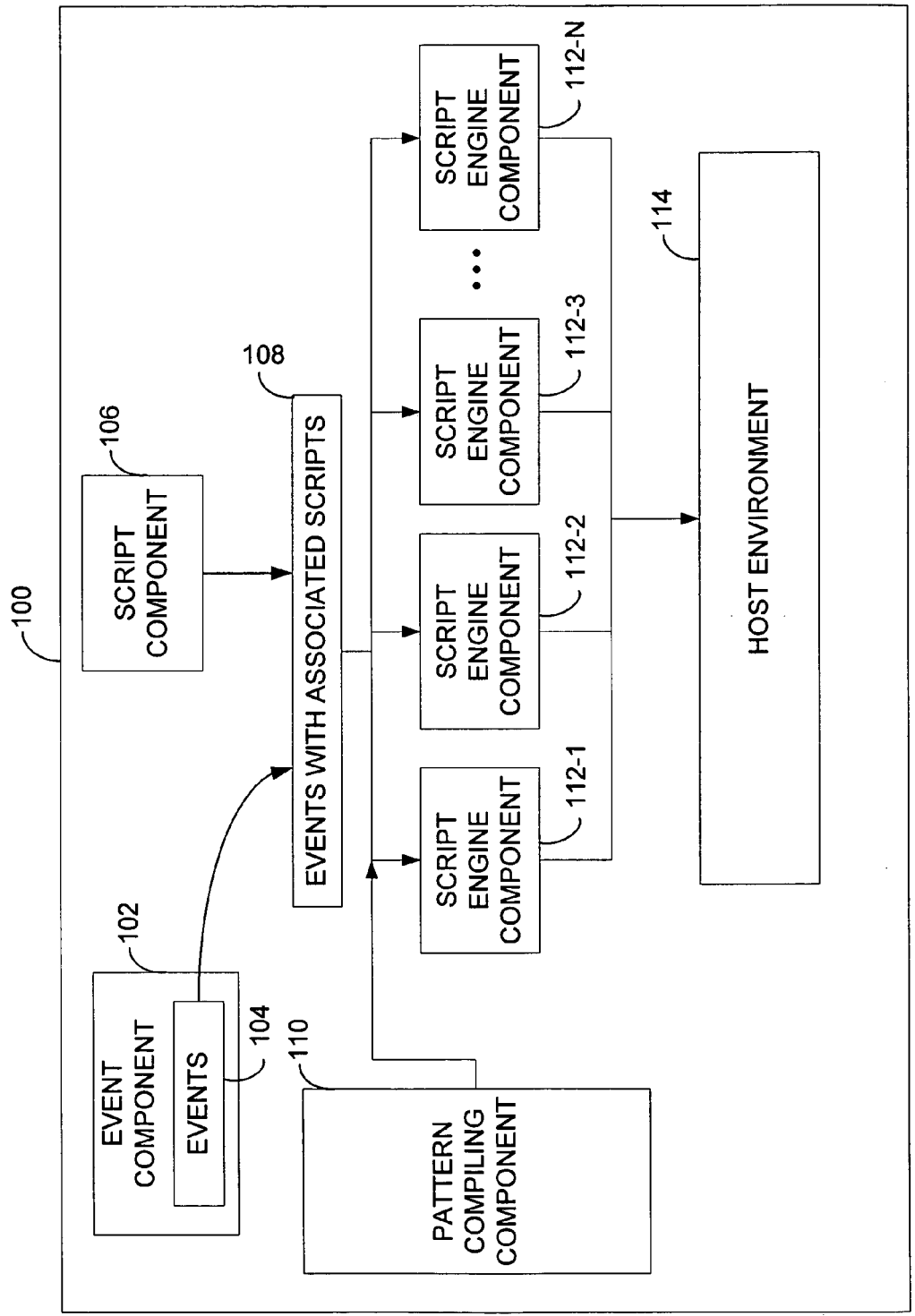
FIG. 1 is a block diagram illustrating a system for identifying a pattern in a series of events according to one embodiment of the invention.

Appendix A describes exemplary algorithms for implementing a method of one embodiment of the invention.

Appendix B describes another implementation of a method of one embodiment of the invention.

Corresponding reference characters indicate corresponding parts throughout the drawings.

DETAILED DESCRIPTION OF THE INVENTION

Referring first of FIG. 1, a block diagram illustrates a system 100 for identifying a pattern in a series of events according to one embodiment of the invention. For example, the system 100 includes a computing device (not shown in FIG. 1) such as the computer 130 in FIG. 7, including a computer server, a collection of computing devices linked by a common communication network (such as an internet, an intranet, or the like), or other computing system that is capable of executing a plurality of pattern recognition engines 112, and a script component 106. The system 100 includes an event component 102 for receiving a plurality of events 104. The event component 102 may include a user interface (UI) or an application programming interface (API) that receives a plurality of events 104 from an event source. Using the above online store as an example, the event component 102 may receive events 104 as event streams from a web server that receives user login sessions, or the like. In the ATM example, the event component 102 may receive the ATM transactions from ATM machines and the common communication network. The events 104 include occurrences of discrete steps of activities, such as ATM transactions, user login or interaction with a commercial web site, a user login session with a secured network, or the like. On the other hand, a non-occurrence of an activity may be represented by an event which is missing in the events 104.

The system 100 also includes a pattern compiling component 110 responsive to compiling a pattern description, which defines a series of events in a sequence. For example, in the "abandoning of the shopping cart" example above, the pattern description may define the pattern as (1) user login, (2) place item in the shopping cart, (3) checkout, and (4) no completion of the purchase of item(s) in the shopping cart in ten minutes. As another illustration of the pattern, a pattern description of an "ATM fraud" may define a series of automatic teller machine (ATM) transactions as: (1) a first attempt to make an ATM transaction in location A by a customer's ATM card and (2) a second attempt to make another ATM transaction with the same card in different location B within ten minutes of the first attempt.

Another example of the pattern description is to identify "theft or shoplifting" at a hardware store. For example, items in a hardware store may be marked with a radio frequency identification (RFID) tag which contains information relating to the items, such as item number, item serial number, per unit price, or other metrics information of the item. An RFID tag reader at a checkout counter emits radio signals to scan the presence of the RFID tags in the hardware store to register the items that are being purchased by the customer. Another RFID tag reader is also located at the exit of the hardware store to monitor the items as they leave the store. An interesting pattern in this situation is the hardware store's system indicates that the RFID tag reader at the exit scans an item's RFID tag showing that the tag has not been scanned at the checkout counter. Such a pattern (i.e., no checkout scan) may indicate a possible theft or shoplift.

A further pattern description example may be illustrated by a "hacker attack" pattern where: (1) a successful virtual private network (VPN) login session is recorded, (2) no attempt to log-in to a domain is recorded, and (3) a failure or success attempt to log-in with the Telnet using the same IP address is recorded. Such pattern of events indicates that the domain is under a hacker attack or someone is attempting to access the domain without using the necessary client component.

According to one embodiment of the invention, every event pattern can be decomposed in several pieces of information illustrated in Table 1:

TABLE 1

Examples of Pattern Descriptions.

| Pattern Sub-Component | Description | Examples |
| --- | --- | --- |
| Name | The Name of the pattern (e.g. output event type) | p |
| Event references with Event-Type | What events are involved, and their local identifiers used in the pattern | a, b |
| Filtering | Non-stateful Pre-Filtering of the events (note that this is very different than Correlation) | $a.s > 100$<br>$b.s > 500$ |
| Sequence | The sequence in which events are expected | $a < b$<br>$a < (b\ or\ (c < d))$<br>$(a\ and\ b) < c$ |
| Timeouts | The timeouts for the event expectations. Note that timeouts may be between any two events, not just on the whole pattern or the sub expression (sequence, and, or) | In case of $(a < b < c < d)$<br>$b.T - a.T < 15\ sec$<br>$c.T - b.T < 10\ sec$<br>$d.T - c.T < 10\ sec$<br>$d.T - b.T < 15\ sec$<br>(note the overlap) |
| Correlation | On what data items the events are correlated | In case of $(a < b < c < d)$<br>$b.x = a.x$ and $b.s > a.s$<br>and $c.y = b.y$<br>and $d.z = c.z$ |
| Result | The properties "promoted" in the pattern. This data can thought of as "output event" either be when the pattern matches, or as data that is available for Query and Analysis on the pattern instances (in-progress or matched) | $p.x = a.x$<br>$p.s = b.s - a.s$ |

Embodiments of the present invention, instead of analyzing data relating to events after they are being stored in data warehouse, watch or monitor the streams of events and evaluate the events in real-time to determine the patterns which indicate meaningful or useful information.

Referring again to FIG. 1, to achieve this, the system 100 includes a script component that compiles the pattern description into set of small scripts, where each script describes the reaction on individual event type that may occur in the events 104. The script includes executable codes, expressions, routines, functions, conditions, or algorithms for indicating how to handle a particular event in order to find the next event in the pattern description. The script defines parameters of the next event as a function of the parameters of the particular event. Table 2 shows examples of operations included in the script.

TABLE 2

Exemplary operations in the script.

| Operation | Description |
| --- | --- |
| SetData | Updates the date accumulated in the pattern with data from the incoming event |
| SetExpectation | Sets expectation for future event |
| RemoveExpectation | Removes expectation for future event |
| SetTimeRestriction | Sets time-restriction on when future event is expected and what to do if it does not occur (timeout) |
| RemoveTimeRestriction | Removes previously registered Time restriction |
| Correlation | Entry point into the script segment that should be executed only if some correlation criteria is true |
| Match | Set the status to Match |
| NoMatch | Set the status to NoMatch |
| If...Else | Control of the script flow |
| Treshold | Automatic Counter for thresholds usually used in If-s |

Returning to FIG. 1, events with associated or attached scripts 108 are forwarded to a plurality of pattern recognition engines 112 for execution. For example, as illustrated in Table 2, the associated script of each of the events 104 includes various operations and the pattern recognition engines 112 which execute the script. In one example, the pattern recognition engines 112-1, 112-2, 112-3 and 112-N are individual instances of the pattern recognition engine 112.

Figure 2A:
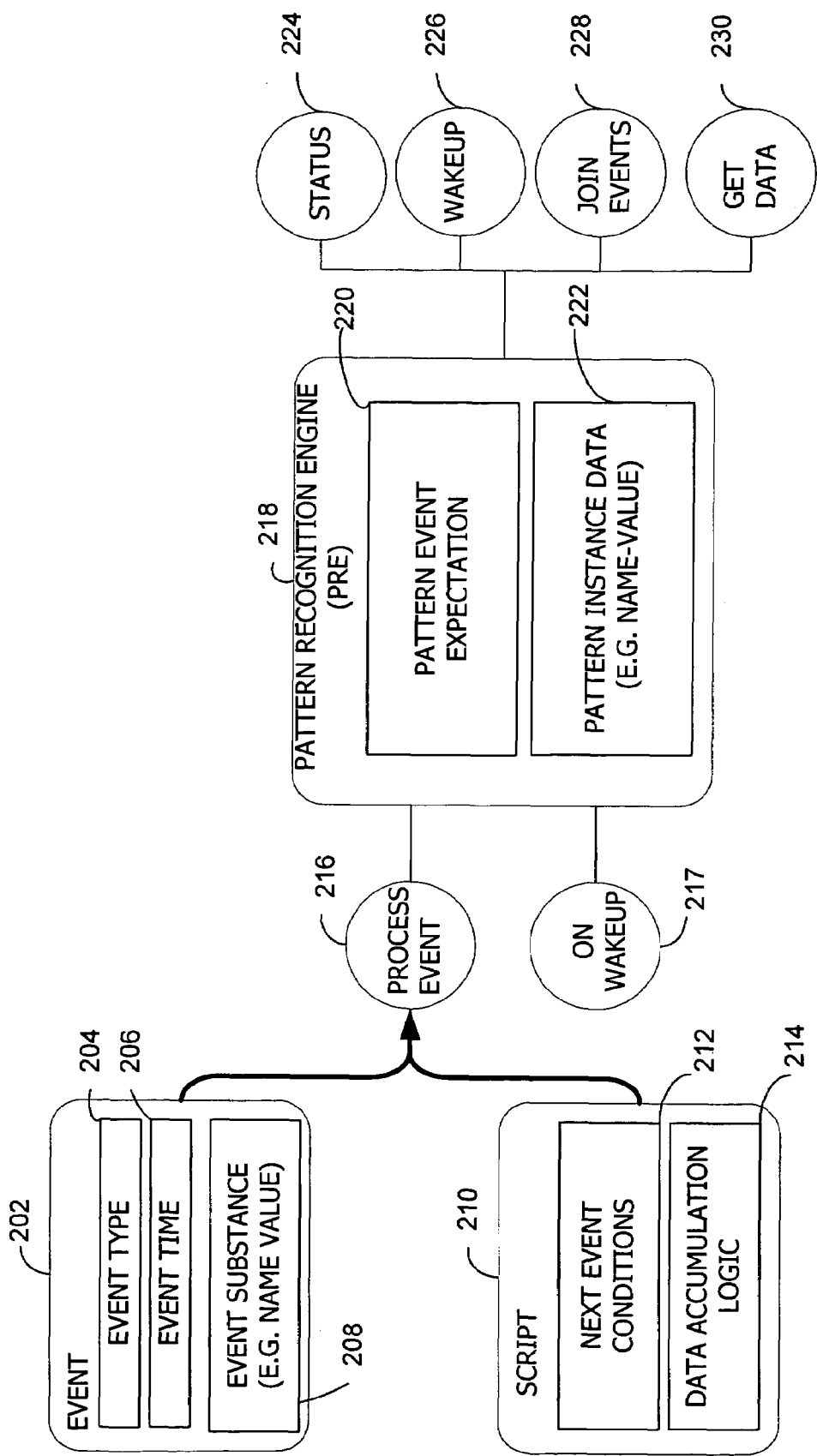

FIGS. 2A-2F are diagrams illustrating an instance of the pattern recognition engine 112 in the process of executing a script associated with an event 104 according to one embodiment of the invention. FIG. 2A is a diagram illustrating interactions among an event 202, a script 210, and a pattern recognition engine (PRE) 218. The event 202 includes parameter relating to an event type 204, an event time 206, and an event substance 208. For example, a typical event in the online purse store example, a user login event may show the event type 204 as "Login," the event time 206 at "10:00 A.M.," and the event substance 208 as: "City=Seattle; State=Washington." In the ATM transaction example, the event type 204 may show "Withdraw," the event time 206 as "9:55 P.M.," and the event substance 208 as "Store0994." In one embodiment, other and additional parameter data for the event 202 may be included for each event 202.

The script 210 includes one or more operations for the pattern recognition engine 112 to process according to the pattern description. For example, the script 210 includes parts such as next event conditions 212 and data accumulation logic 214. As illustrated in Table 2, the script attached or associated with each event 202 indicates how to process subsequent events according to the pattern description (to be discussed in further details in FIGS. 2B-2F). Also shown in FIG. 2A, an instance of the PRE 218 is a generic script interpreter to execute the script 210 and contains the recognition state for individual pattern instance. For example, the PRE 218 may be an executable module in the system 100 that performs execution of the script 210 such that the PRE 218 receives the script 210 at a process event handle 216, processes the next event conditions at pattern event expectations 220, stores pattern instance data 222, and exposes properties according to the script 210 at "Status" 224, "Wakeup" 226, "JoinEvents" 228, and "GetData" 230. For example, in the online shopping cart example, after an "Login" event, the PRE 218 executes the script and updates the status 224 as "Waiting" (i.e., waiting for the subsequent event). The PRE 218 also outputs the "Wakeup" 226 time of 10:05:20 to monitor the status 224. The "JoinEvents" or "GetHash" 228 describes the parameter data that needs to be correlated in the subsequent event and "GetData" 230 allows the external environment to retrieve the data accumulated so far. To allow the support for time restrictions and patterns based on event non-occurrence, the PRE also exposes the method 217 "OnWakeup" which may change the status similar to merging a new event.

In other words, the PRE 218 may be a set of computer-executable instructions that performs interpreting and executing the script 210 which may include one or more operations or routines according to the pattern description. As such, embodiments of the present invention, through the implementations of the script 210 and the PRE 218, are versatile in adapting to processing events and evaluating patterns of different conditions and parameters because the PRE 218 relies on an external environment (e.g., the script 210 and the event 202) to process relevant events 202 and scripts 210. The advantages of the embodiments of the invention at least eliminate the need for customized code or pattern processing for different users and different events because regardless of the types of events or types of patterns each user is interested in, the system 100 compiles the pattern description, associates the script that meets each user's needs so instances of the PRE 218 may execute the script to determine the occurrence of the pattern.

In one embodiment, a host environment including a computer, a computing system, a server, a plurality of servers, or other automated event receiving processes or applications provide the pattern description and/or the script for each event.

In another embodiment, the PRE 218 may be implemented as a small C# class programming language which may be implemented as user data type (UDT) or other programming languages, models, or the like. The small C# class may be responsible for holding the state of recognition of one individual instance of the pattern. The state may include the expected events and timeouts, and the data accumulated from the events, or other data according to the script 210. In this embodiment, the event 202 may be passed to the PRE 218 also a C# class (UDT) containing the event type, the timestamp when the event happened (e.g., from the machine in which it happened), and some data relating to the substance of the event 202. In one implementation of embodiments of the invention, the event 202 is passed to the PRE 218 through the routine OnEvent.

Figure 2B:
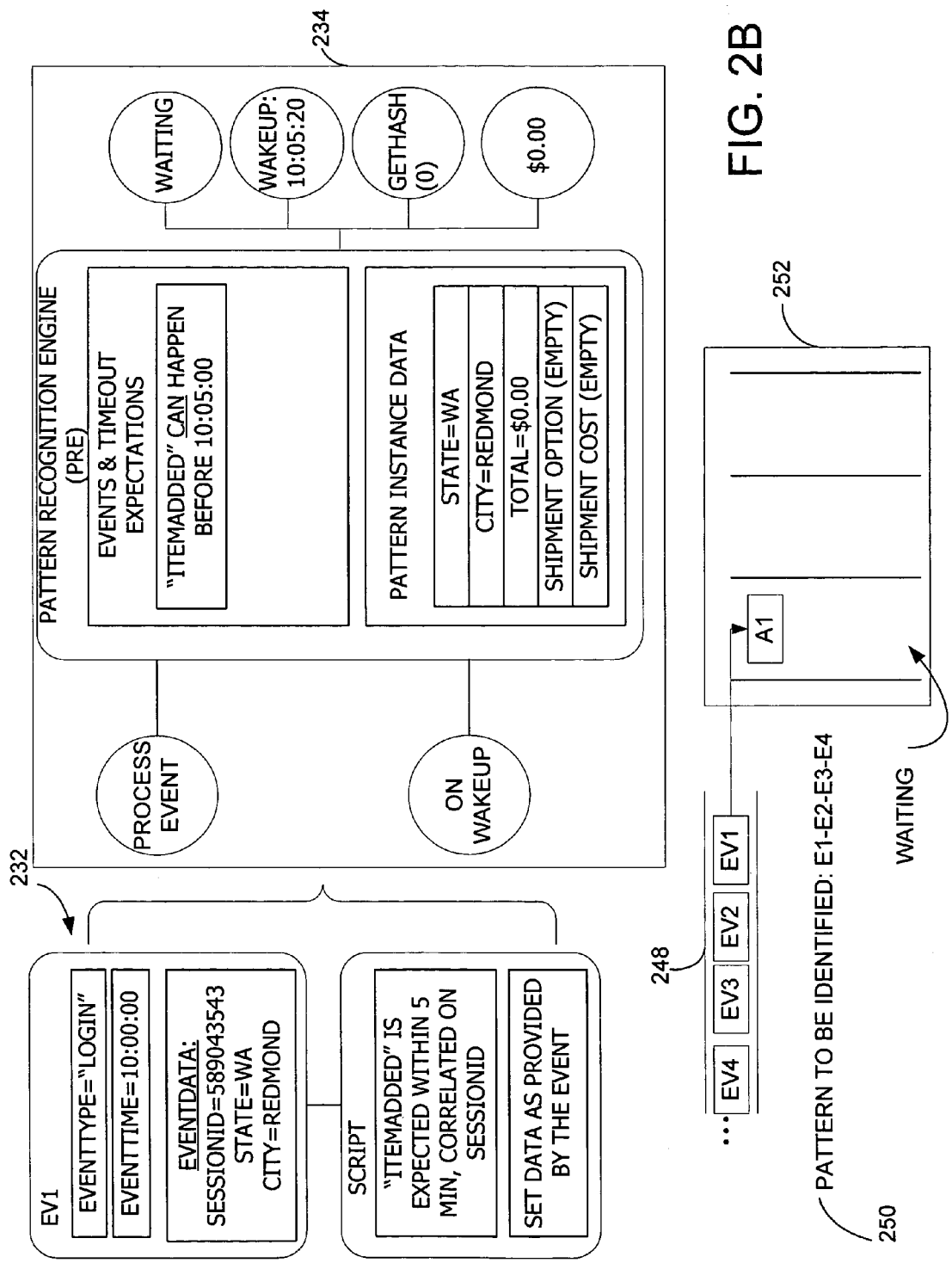

As an illustration, the "abandoning of the shopping cart" pattern is described in FIGS. 2B-2F. FIG. 2B illustrates evaluation of a pattern with a pattern description 250 defining the pattern as a series of events: E1-E2-E3-E4, where E1 stands for "Login," E2 stands for "ItemAdded," E3 stands for "Checkout," and E4 stands for non-occurrence of the event "Pay." If there is a series of events that contain these four events, the series may indicate that the user has abandoned her shopping cart. An event source 248 shows that events EV1, EV2, EV3 are currently waiting to be processed. Initially, the event EV1 232 indicates that it is the event type "Login" with an event time of "10:00:00" and an event substance data of "SessionID=589043543," "State=WA," and "City=Redmond." The script attached to the event EV1 232 includes the following operations to process the event EV1 232: (a) an event type "ItemAdded" is to be expected within five minutes, (b) correlate this event with the event type "ItemAdded" based on "SessionID," and (c) set data provided by the event EV1 232.

The event EV1 232 is passed to the PRE 234 which executes the attached script of the event EV1 232. For example, after executing the script, the PRE 234 indicates that an event type of "ItemAdded" needs to occur before an event time of "10:05:20." The PRE 234 also needs to correlate the "SessionID" data of the EV1 with the "ItemAdded" event so that they belong to the same series (i.e., the same user and a given login session). In other words, the script of the event EV1 defines the type, time, and substance parameters of the next or expected event as a function of the parameters of the event EV1 according to the pattern description. It is to be understood that other identifying data among the events may be used so as to correlate data among the events during execution of the script.

In one embodiment, the "Login" script for the event EV1 is an activating event which indicates that it is the first event in a series. As such, a snap shot 252 of the execution of the script by the PRE 234 shows that the event EV1 232 is the first event in a series A because the EV1 is the first of the defined pattern (e.g., the "Login" event). Also, the status of the series A is "Waiting" because the script indicates that an event "ItemAdded" is expected to occur by the same user under the same SessionID. Alternatively, if the event "ItemAdded" does not occur in the time required by the script of the EV1, the series A is discarded because the events no longer match the defined pattern description. That is, the operation "WakeUp" in the script indicates the PRE 234 is to update the status of the series A to determine if the expected event has occurred. The GetHash(0) called on the PRE 234 will now return the hash of the SessionID.

Figure 2C:
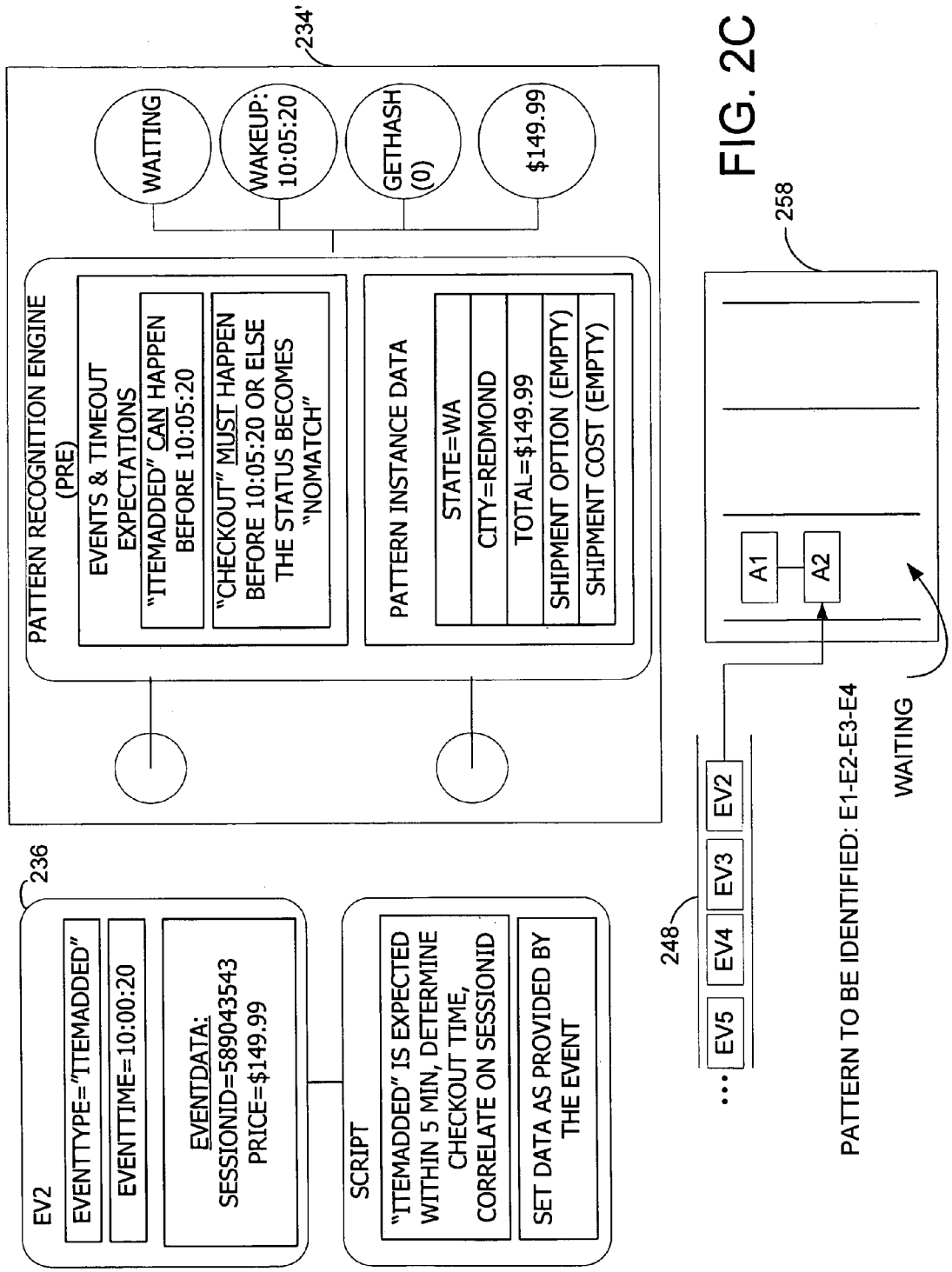

Referring now to FIG. 2C, a new event EV2 236 is received from event source 248 and the event type is "ItemAdded" with an event time of "10:00:20" and the "SessionID" is also 589043543. As the parameter data of the event EV2 corresponds to the expected event defined by the script of the event EV1, it is determined that the event EV2 belongs to the same series A as the event EV1. For example, in determining that the event EV2 belongs to the same series A as the event EV1, it may be achieved by finding the proper PRE instance 234 based on hash, and invoking the instance of PRE 234' with the script for "ItemAdded", which may ignore the event EV2 if it does not match exactly. Here, the snapshot 258 of the pattern recognition processing shows what happens when the event EV2 belongs to the series A. In this case, the script associated with the event EV2 defines the next or expected event and the PRE 234' executes the script accordingly. For example, the script of the event EV2 indicates that another "ItemAdded" event may occur within the next 5 minutes; the checkout time is to be determined and SessionID is used to correlate data with the next event. After execution, the PRE 234' shows the parameter data of the next event in the series A. For example, another "ItemAdded" event can occur before "10:05:20" (i.e., 10:00:20+5 minutes), and if the "Checkout" event does not occur before 10:05:20, the series A does not match the "abandoning of the shopping cart" pattern according to the pattern description.

Figure 2D:
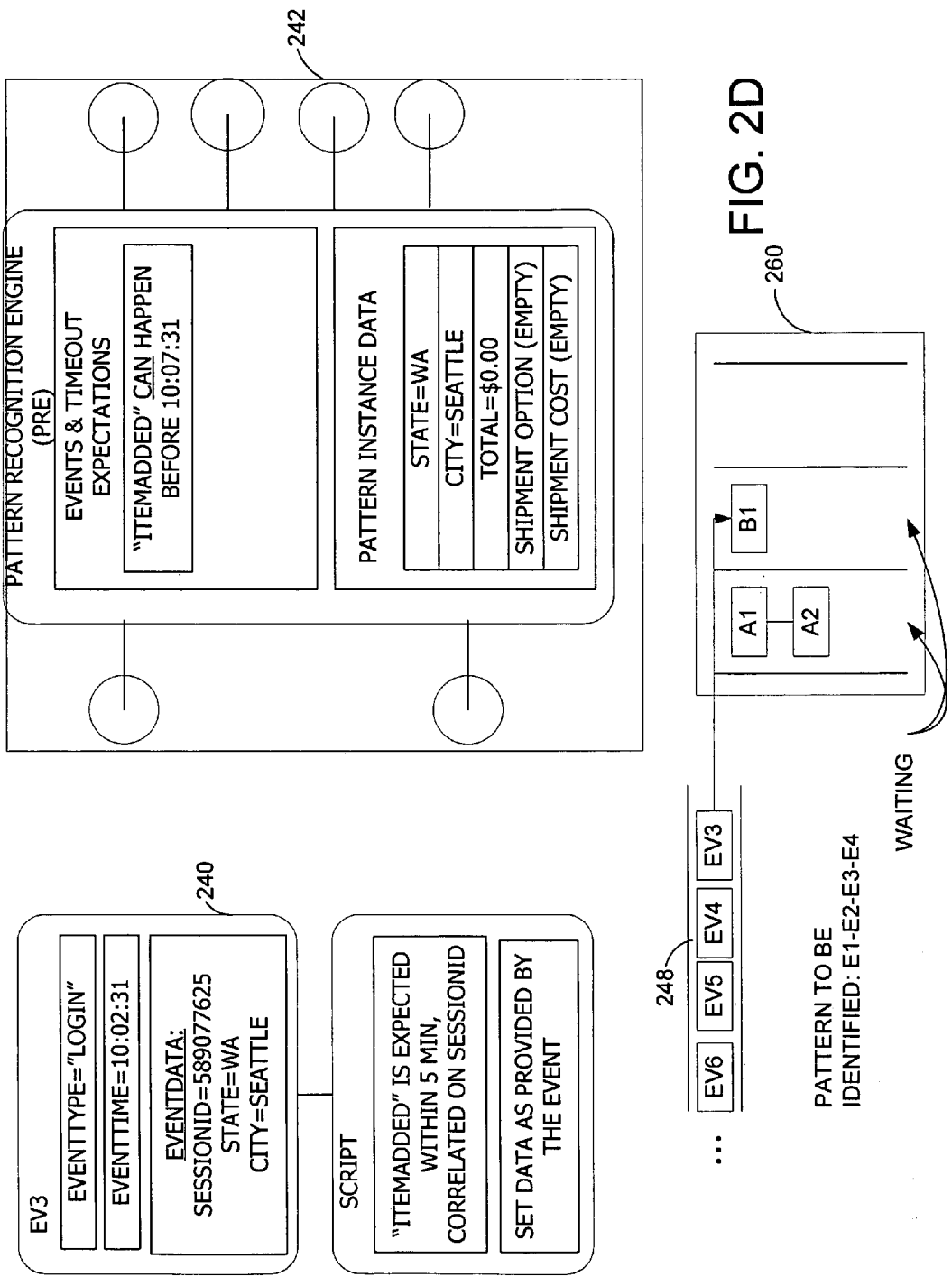

Referring now to FIG. 2D, a new event EV3 240 is received from the event source 248 with the following parameter data: event type: "Login," event time: "10:02:31," and "SessionID:" 589077625. In one example, the script for "Login" indicates that this is an activating event, the event EV3 240 is determined to start a new series B because the SessionID does not match that of the events EV1 232 and EV2 236. As such, a snapshot 260 indicates that the event EV3 is the first event in the series B. Also, note that the script of the event EV3 defines a next event (e.g., "ItemAdded" to occur before 10:07:31," or the like) and a new instance of the PRE 242 executes the script of the event EV3 240.

Referring next to FIG. 2E, another event EV4 256 is received with an event type of "Checkout," an event time of "10:02:40" and a SessionID of 589043543. The parameter data of this event EV4 256 matches the parameter data defined by the script of the event EV3 240. As such, a snapshot 262 shows that the event EV4 belongs to the series A and it is the third event in the series A. The script of the event EV4 256 indicates that a "Pay" event is not expected in the next five minutes. As such, the PRE 234" executes the script of the event EV4 256 and indicates that the "Pay" event must not occur before "10:07:40." Otherwise, the status of the series A is set to indicate that the series A does not match the pattern of "abandoning of the shopping cart."

Figure 2F:
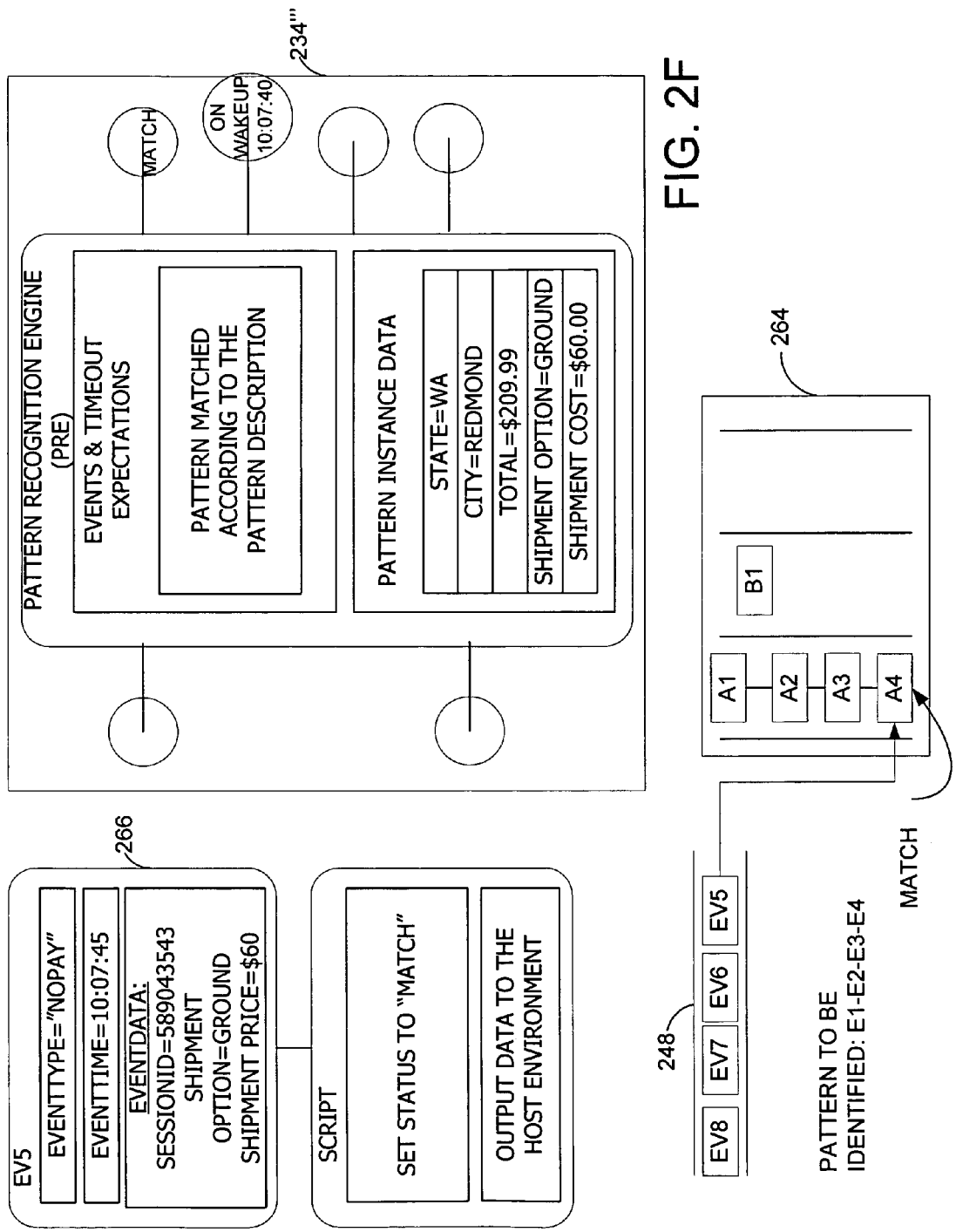

Referring to FIG. 2F, the timeout that was set for "Pay" results in exposing the time "10:07:40" via the WakeupTime property. In addition the PRE 234'" remembers that if this timeout occurs, the new status should be "Match" as no more events are expected for the pattern. For example, a host environment (e.g., the host environment 114) that manages large number of PRE instances may keep a sorted list or an index based on WakeupTime. The index may be used to find all instances that need to be woken up. For example, at 10:08, it may be determined that the method OnWakeup of the PRE instance 234'" needs to be called. When this happens the PRE instance 234" sets its Status to "Match" which indicates to the host environment that the pattern of "abandoning of the shopping cart" is matched.

In one embodiment, the PRE 234'" exposes the state of the event series and the data relating to the pattern to the host environment for analysis of the event series and the pattern. As an example such hosting environment can keep Hashtables based on GetHash( ) and sorted list based on WakeupTime, both pointing to sets of PRE instances. This in-memory host environment may output the matched patterns as output events. The in-memory host environment keeps multiple instances of the engine in its storage, such as volatile, non-volatile, or a combination of volatile and non-volatile memory and delivers the incoming events and script operations (e.g., wakeup notifications) to the proper engine instances. The in-memory host environment also discards the irrelevant events and/or the PRE 234 having status as "NoMatch."

In a file-based host environment, parameter data of the event series and the data relating to the pattern may be organized by serializing all instances of the PRE 234 in a collection of files or a file to allow recovery of the accumulated state in case of crash of the host environment, the PRE 234 or a combination thereof.

Another implementation of a host environment may be an SQL-based host environment which implements the PRE 234 as a UDT (User Data Type—new feature of SQL 2005) so that script operations (e.g., timeout notifications) and large number of input events are efficiently delivered to large number of waiting instances of the PRE 234 using indexes on the properties accessible to the PRE 234. The SQL-based host environment may include a data-view of the incoming events or the event streams by promoting some or all of the data from the PRE 234 into SQL columns so that all the instances of event composition are visible and may be queried as a table (to be discussed in FIG. 3). In another example, the table or data structure storing the matched pattern events may be partitioned.

It is to be understood that other patterns may be evaluated and identified to meet the user's interest and additional examples or applications of the embodiments of the invention may be employed with departing from the scope of the present invention.

Figure 3:
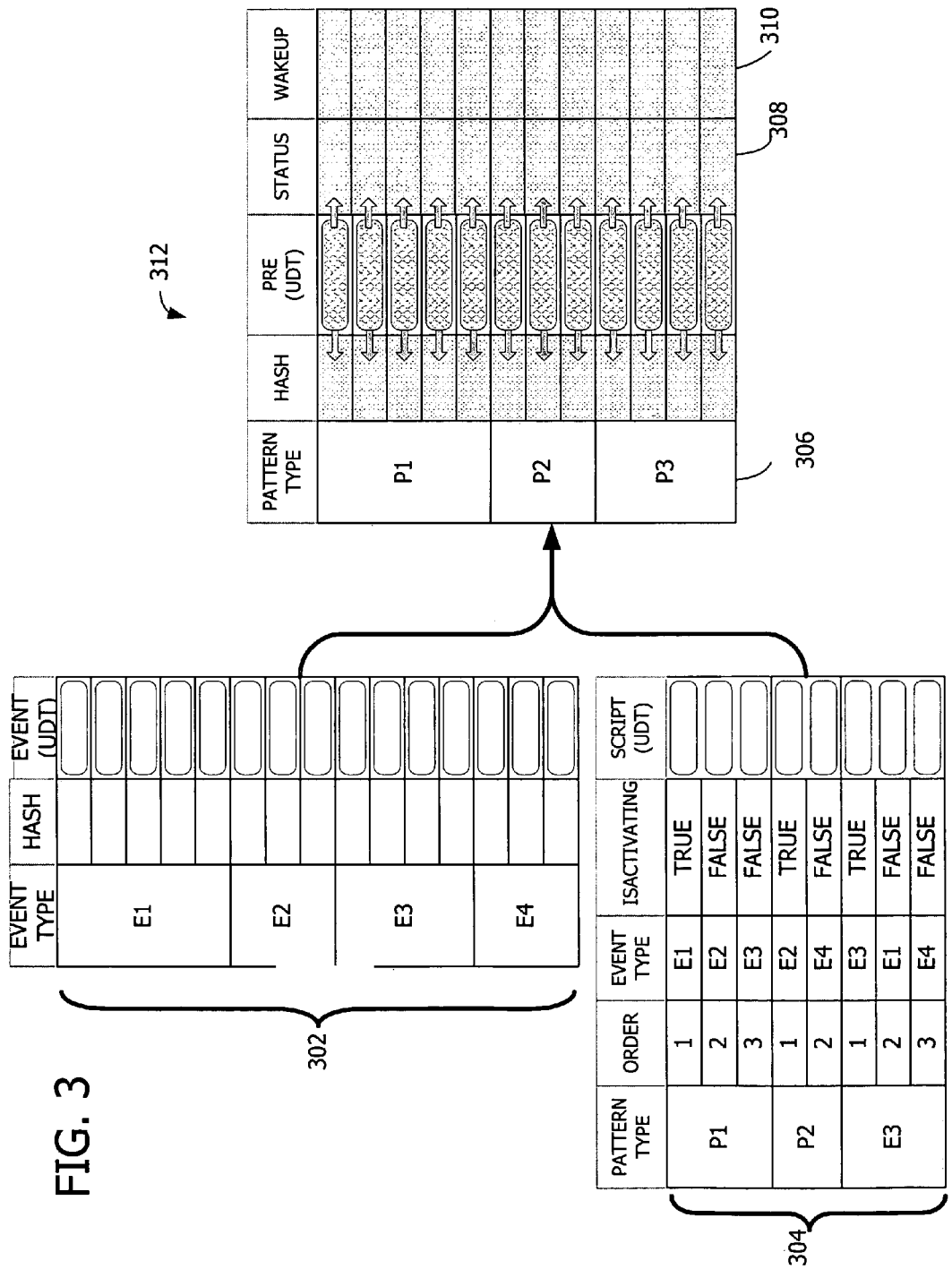
FIG. 3 is a diagram illustrating a data structure for storing data relating to a pattern according to one embodiment of the invention.

Referring now to FIG. 3, a diagram illustrates a data structure 312 for storing data relating to a pattern according to one embodiment of the invention. An event data structure stores events in a table 302. A script operation table 304 includes the pattern description with the script operation for each of the events to be identified. In one implementation, events are stored as UDTs in the table 302. The table 302 may include columns for the "Event Type" and the "Hash of the join criteria to join events." For example, for an online shopping event, the event type may be "Login," "Checkout," "ItemAdded," or the like and the hash may be based on the SessionID. In one embodiment, the columns in the table 302 may be included as a clustered index so as to optimize the physical storage of the table in disk sectors of the memory of computing systems (such as the computer 130 of FIG. 7).

Deploying a new pattern type into such hosting environment may be achieved by inserting rows into table 304 that contain the scripts for the operations to be executed for each of the event types. Initially, the table 302 may be empty and as one ore more events are received from the event stream or event source 104, rows of the table 302 begin to fill with data relating to the events. The event table 302 and the script operation table 304 are correlated to the pattern table 312 where the patterns are evaluated and identified. The pattern table 312 includes information derived from the event table 302, the script operation table 304, and executed script information from the PRE. In one implementation of the pattern table 312, a SQL statement may define the pattern table 312 as:

--- create table Patterns
(
PatternType nvarchar(256),
Hash as PRE.GetHash(0) persisted, -- promoted from the PRE
PRE as PatternRecognitionEngine, -- this is UDT registered before
Status as PRE.Status persisted, -- promoted from the PRE
Wakeup as PRE.Wakeup persisted -- promoted from the PRE
)

---

In one embodiment, the pattern table 312 is sorted and organized by pattern types 306. For example, as shown in the pattern table 312, a pattern P1 is indexed above a pattern P2. Also as illustrated, the pattern P1 includes one or more pattern instances (as shown by rows within pattern P1) where each row for each pattern instance indicates the pattern is waiting or expecting additional events. In addition to the index or sorting of pattern types, one embodiment of the invention organizes the pattern table by indexing the status column 308 and the wakeup column 310.

Figure 6A:
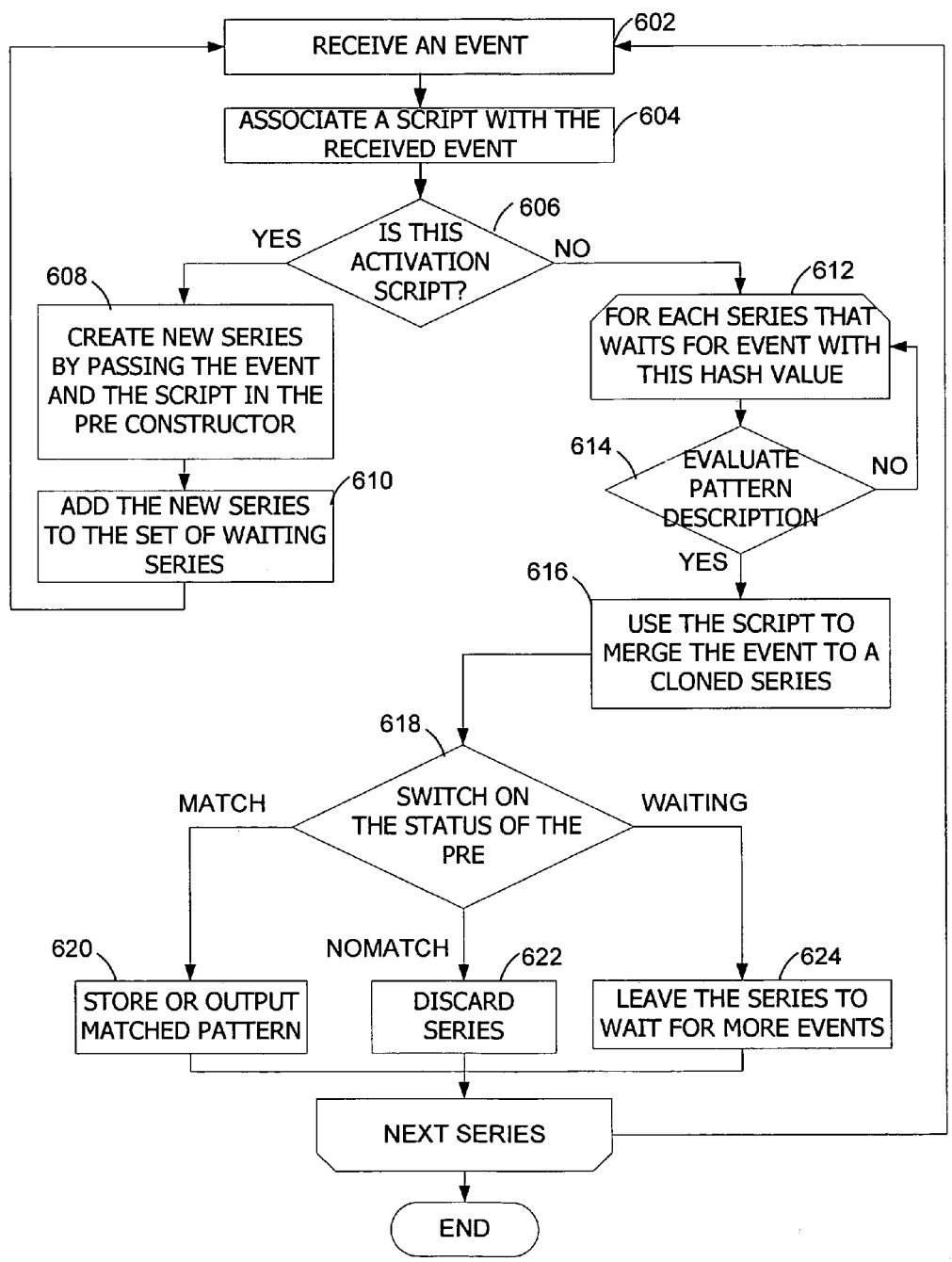
FIGS. 6A-6B are flow charts illustrating a method for identifying a pattern in a series of events implemented by a hosting environment according to one embodiment of the invention.
Figure 6B:
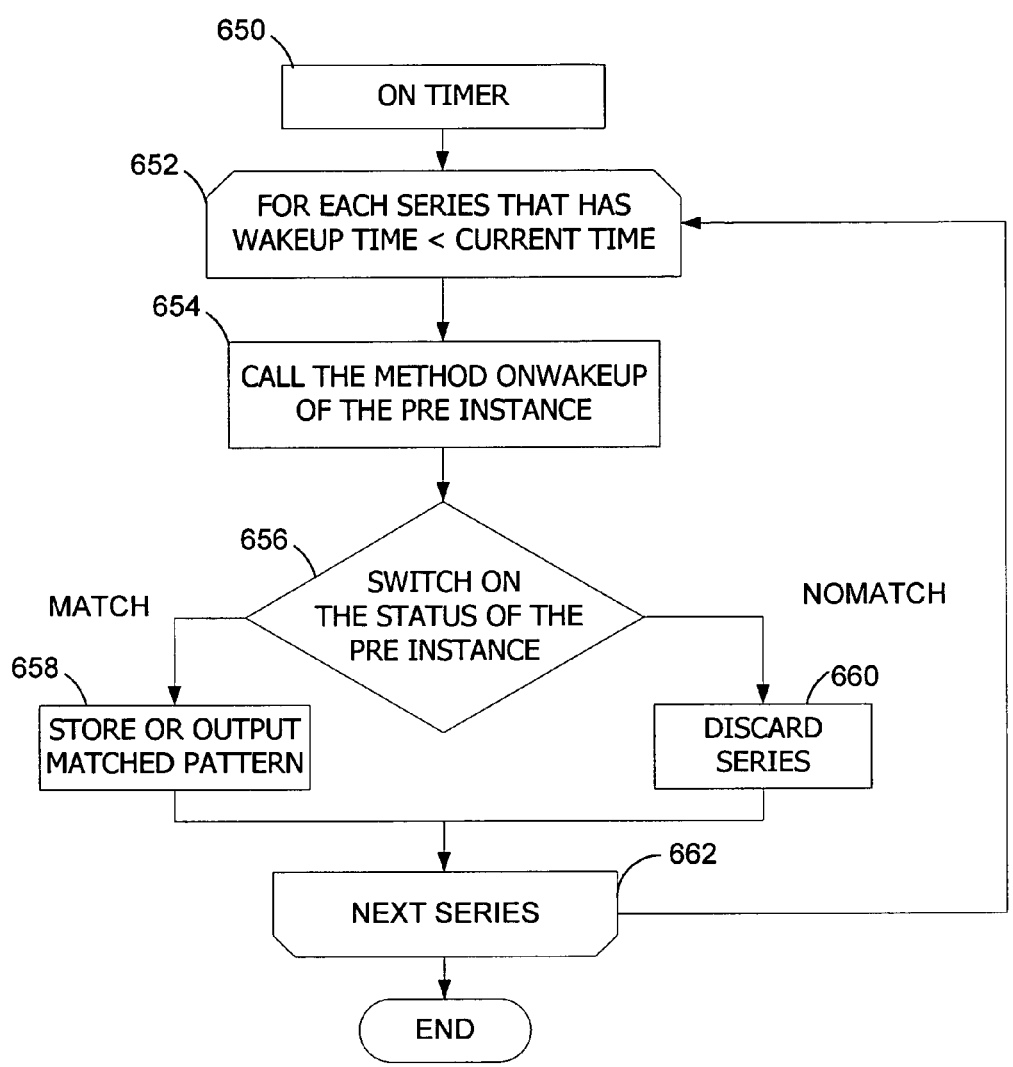

Therefore, as rows of new events are created in the event table 302 and the corresponding script operation table 304, instances of PRE execute the script according to the script operation table 304 to identify subsequent events in the series of pattern events to be evaluated. As such, embodiments of the invention implement an algorithm to independently identify each pattern in parallel. In other words, one instance of the PRE may execute the script associated with events to evaluate the pattern P1 while another instance the PRE may execute the script associated with events to evaluate the pattern P2. Appendix B illustrates exemplary implementation of the algorithm and FIGS. 6A and 6B illustrate an exemplary method derived from the algorithm.

Figure 4:
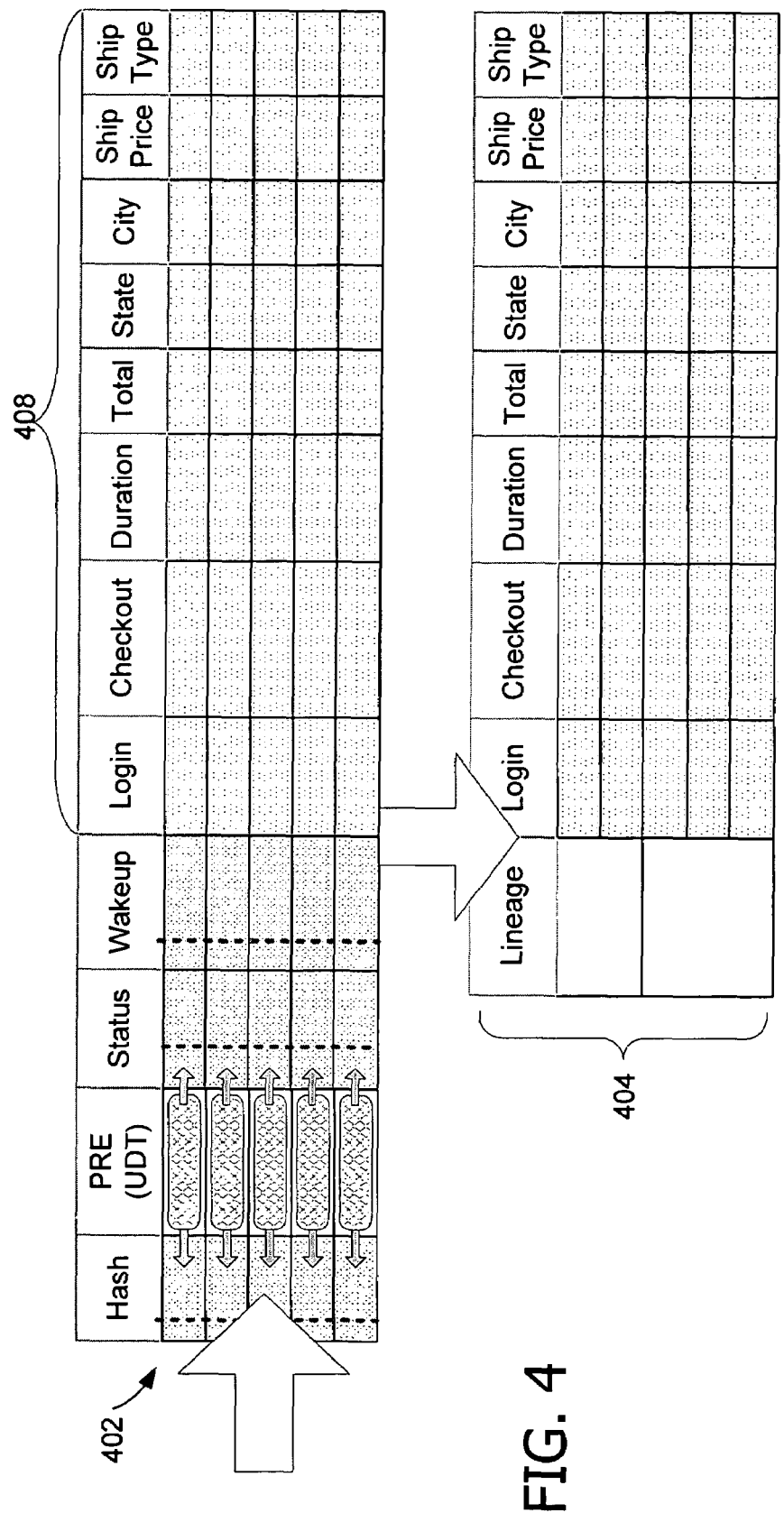
FIG. 4 is a diagram illustrating a data structure for organizing stored data in FIG. 3 for query according to one embodiment of the invention.

FIG. 4 is a diagram illustrating a data structure for organizing stored data in FIG. 3 for query according to one embodiment of the invention. A pattern table 402 includes a collection of patterns as a result of evaluating the pattern events. For example, a collection 408 includes parameter data collected or extracted from the PRE instances, such as "Login", "Checkout", or the like. The pattern table 402 further includes information relating to the execution of the PRE. In one embodiment, the matched patterns in the pattern table 402 are moved to a separate matched pattern table 404. As such, the matched pattern table 404 may be efficient searched or queried to further evaluate or remedy the transaction for the online purse store.

Figure 5:
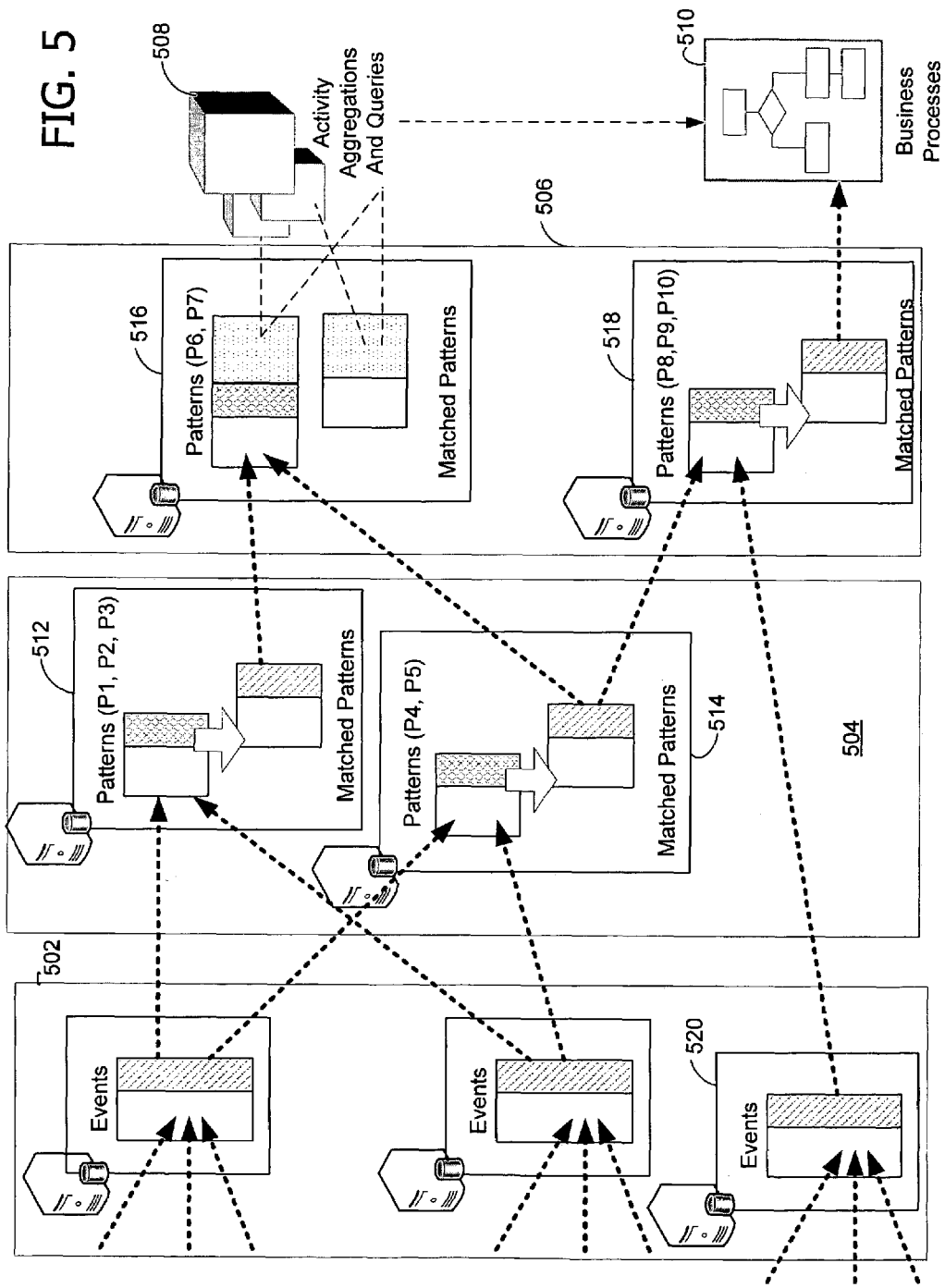
FIG. 5 is a diagram illustrating a collection of cascaded servers for identifying a pattern in a series of events according to one embodiment of the invention.

FIG. 5 describes a diagram illustrating a collection of servers for identifying a pattern in a series of events according to one embodiment of the invention. A plurality of collecting computers 502 collects related events as a series of pattern events. For example, suppose the online purse store employs a number of front-end servers to collect data from user interactions with the online web site. These front-end servers are part of the collecting computers 502 that collect the events such as user login sessions, placing items in the user's shopping cart, or the like. Each of the collecting computers 502 may implement pattern descriptions, associating script to each of the events and executing the script using the PRE as described in FIGS. 1 and 2A-2F.

A first set of computers 504 next identifies a first portion of the pattern in each collected series. Each of the collected series matches the first portion of the series of pattern events. For example, a computer 512 may be configured to evaluate patterns (P1, P2, and P3) while a computer 514 may be configured to evaluate or identify patterns (P4 and P5). These patterns P1-P5 may be regarded as events by a second set of computers 506. Hence, the second set of computers 506 receives the events (i.e., patterns P1-P5 from the first set 504) to identify a second portion of the pattern in each series. As such, the first portion of the pattern identified by the first set 504 and the second portion of the pattern identified by the second set 506 are accumulated and stored for evaluation. In other words, the first set 504 may be regarded or treated as the collecting computers for the second set 506. As shown in FIG. 5, a computer 516 of the second set 506 receives as events from both the computers 512 and 514 of the first set. On the other hand, a computer 518 in the second set 506 receives as events from the computer 514 of the first set 504 and from a computer 520 of the plurality of collecting computers 502.

According another embodiment of the invention, one or more hosting environments described may be a part of a distributed infrastructure for pattern matching on event-streams, so that some nodes (e.g., hosting environments) may b in-memory compositions of hosting environments, some may be file-based while others may be SQL-based hosting environments. In addition, there may be scenarios in which some other processing is performed on the event streams between the compositions. Examples of such processing may include executing custom code, business rules, or transformations on the event-streams.

As the matched patterns are evaluated by the first set 504 and the second set 506 of computers, data from the matched pattern and/or parameter data of the pattern events may be outputted to a host environment 508 (e.g., SQL-based host environment) or to a workflow business process analysis host environment for further processing of the matched pattern.

Referring now to FIGS. 6A and 6B, flow charts illustrating a method for identifying a pattern in a series of events implemented by a hosting environment according to one embodiment of the invention. In one embodiment, exemplary algorithms in Appendix A describes one implementation for identifying a pattern in a series of events. Initially, when a new event is received at 602, it is immediately or substantially immediately associated with a script at 604, based on the event type. At 606, different paths may be taken to determine whether the event should activate a new series. For example, as described in FIGS. 2A-2F, a "Login" event is an activating event because it is the first event in the series. If the event is activating, a new series is created at 608 and is added to the set of series that are waiting for events at 610. For example, in an in-memory hosting environment, this may be creating of a new PRE instance and registering it in a hashtable and a sorted list on wakeup time. In another embodiment where an SQL-based hosting environment is implemented, the SQL-based hosting environment may insert the PRE instance as UDT into the Patterns table. It next proceeds to receive one or more events at 602.

If the script is not activating, the series that may be possibly interested in this event are to be processed at 612. For example, this may be achieved by first calling the OnEvent method of the PRE instance and passing the incoming event with the attached script. The PRE performs the next two operations at 614 by evaluating the pattern description. It is important to note that matching of the hash value does not necessarily mean that the correlation condition is satisfied. For example, suppose the hash was for some string that is to be used for correlation according to the pattern description, like social security number or name. As such, the PRE computes the actual pattern description against the data of the incoming event and the state accumulated in the series so far. If the evaluation of the pattern description is negative, the event is ignored for the series.

If the evaluation is positive, at 616, the event is merged into the PRE. As a result of merging the event with the accumulated state, the status of the PRE instance may be changed or updated. For example, if a "Pay" event was received for the given SessionID, the status changes to "No Match". At 618, based on the status, the hosting environment determines what to do with this series. If the status is "Match" (e.g., a series of events has matched a pattern), the series is considered successfully complete and the series may be removed from the set of waiting instances and the accumulated data is sent as composite event at 620. Alternatively, the matched series may be kept for queries and analysis in another table as illustrated in FIG. 4.

If the status is "No Match", the series may be discarded or ignored at 622. At 624, if the status is "Waiting", the series is left to wait for more events by proceeding to 602.

In another embodiment of the invention, the event may not merge with any existing series or start a new series, but a copy or a clone of the series may be created before 616. As such, both a related or subsequent event and the cloned copy of the series are processed. As an illustration, suppose a pattern description P1 defines the following three events:

Events A, B, and C where the x value of event A is equal to the x value of event B and the y value of event B is equal to the y value of event C.

In identifying the events A-B-C, initially, an event ev1 is received where the x value is 1 and does not have a y value. Based on the pattern description, the event ev1 is an activating event because it only includes an x value without an y value. As such, the event ev1 starts a new pattern series S1. A second event, ev2, is received and includes an x value of 1 and an y value of 2. The pattern series S1 would identify the event ev2 as an event in the pattern P1 because the both x values of the events ev1 and ev2 are the same.

On the other hand, if there is an incoming event ev3 that includes an x value of 1 and an y value of 3, the pattern series S1 would ignore the event ev3 because it is not a related or a subsequent event, that is event C that has an y value that is equal to the y value of B (i.e., ev2).

Advantageously, in this embodiment, the present invention clones or copies the series S1 which includes event ev1 such that there are two copies of the series: one copy is the original copy of the series S1 and the other copy will be used in a new series S2. As such, the series S1 would have the event ev1 in the series. On the other hand, the new series S2 has the events ev1 and ev2. With this implementation, when the incoming event, event ev3, is received, both the series S1 and S2 will evaluate and identify whether the event ev3 may match the pattern P1. The series S1 would include the event ev3 because the x value of the event ev3 is equal to the x value of the ev1. The series S2, however, would ignore the event ev3 because the y value of the event ev3 is not equal to that of the event ev2. Next, suppose a new event ev4 is received with only an y value of 3. In this situation, the series S1 and S2 will evaluate the pattern description. With the cloned or copied series, the series S1 identifies the event ev4 as the event C and there is a matched pattern. On the other hand, the series S2 would not identify the event ev4 as the event C. If there is no cloned series S1 or cloned event ev1, the pattern would not be matched because the event ev2 (B(x=1, y=2)) would be identified by the original series S1 and the event ev3 would be ignored by the original series S1 because it would only expect the event C, according to the pattern description. This cloning is necessary because another more relevant match may occur in the future.

According to the embodiment described above, the compilation of the pattern description and attaching of the event scripts determine whether cloning of the existing series may take place. For example when the series is waiting for non-occurrence, such as the event "Pay" in the shopping cart example, this type of event must be directly merged with no cloning, because the pattern description is to terminate the series. If, on the other hand, we are merging some event like the event B above, which includes the additional relationship or condition with the event C, the pattern description would require cloning of the series because it may take one series to identify the pattern.

In another embodiment, where series of events are waiting for an occurrence of an event, the waiting series may also be modified based on timer as illustrated in FIG. 6B. For example, at 650, a time period is calculated by a timer by keeping a timestamp of the last event from the event source. Alternatively, the event source may send signals on fixed intervals which will cause the algorithms described in Appendix A or Appendix B to execute. At 652, for each series that is waiting for a later event (i.e., Wakeup time<current time), (e.g., a "Login" event is waiting for a "ItemAdded" event), the operation of OnWakeup for each PRE instance is executed at 654. Consequently, this results in changing of the PRE Status of the PRE instance at 656. In the "abandoning of the shopping cart" example, suppose a PRE instance is expecting a "Pay" event to be received in 5 minutes. When the "Pay" event is not received in 5 minutes, the OnWakeup operation is executed and the status of the PRE instance is changed to "Match" (i.e., the online shopper has abandoned the shopping cart). At 658, the hosting environment stores or outputs the matched pattern while the hosting environment may discard the series at 660. The method would evaluate the next waiting series at 652 or would terminate at 662.

It is important to note that the methods illustrated in FIGS. 6A and 6B and the corresponding algorithms described in Appendix A are exemplary and may be implemented in any order. For example when PRE is used inside an SQL-based hosting environment, millions of instances may be affected with a single operation (e.g., UPDATE operation), during which each instance of PRE may be executed in parallel with other PRE instances.

FIG. 7 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 7 illustrates operating system 144, application programs 146, other program modules 148, and program data 150.

The computer 130 may also include other removable/non-removable, volatile/nonvolatile computer storage media. For example, FIG. 7 illustrates a hard disk drive 154 that reads from or writes to non-removable, nonvolatile magnetic media. FIG. 7 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 7, provide storage of computer readable instructions, data structures, program modules and other data for the computer 130. In FIG. 7, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 7 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 7 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 one or more computer-readable media having computer-executable components execute computer-executable instructions such as those illustrated in FIG. 6 to implement the invention.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above systems and methods without departing from the scope of the invention, it is intended that all matter contained in the above description and shown in the accompanying drawings shall be interpreted as illustrative and not in a limiting sense.

Appendix A

Exemplary algorithms for each PatternType P in MergeLogic (in parallel) according to one embodiment of the invention:

```
For each PatternType P in MergeLogic (in parallel)
    Loop for each EventType E for this pattern (in sequence)
    IF (IsActivating)
        INSERT Patterns(PatternType,PRE)
        SELECT P, InitializePRE(Event,Script)
        FROM Events
        WHERE EventType=E
    ELSE
        UPDATE Patterns
        SET PRE.OnEvent(Event,Script)
        FROM Patterns p JOIN Events e
        ON Patterns.Hash=Events.Hash
        WHERE PatternType=P
        AND EventType=E
    UPDATE Patterns SET PRE.OnWakeup( )
    WHERE PatternType=P AND Wakeup<@Now
    FROM Patterns WITH(INDEX(WakeupIndex))
    INSERT MatchedPatterns
    SELECT Patterns WITH(INDEX(StatusIndex)
    WHERE PatterType=P AND Status=Match
    DELETE FROM Patterns WITH(INDEX(StatusIndex)
    WHERE PatterType=P AND Status>Waiting
```

Appendix B

For example, the algorithm begins with a loop for each event-type in the order or sequence expected by the pattern. For example, in the script operation table 304, the pattern description for the pattern P1 defines the pattern as have event types E1-E2-E3, and the script for the events E1, E2 and E3 evaluates the parameter data. In the script operation table 304, the following variables are defined for each event: @PatternType, @EventType, @IsActivating and @Script.

The algorithm determines first if the Event type is activating or is part of one or more existing series of pattern events by providing the following exemplary SQL statement:

```
INSERT Patterns(PatternType,PRE)
SELECT @PatterType, InitializePRE(Event,@Script)
FROM Events
WHERE EventType=@EventType
```

In the exemplary implementation above, a function InitializePRE ( ) is user defined function implemented in C# that accepts the activating event and the corresponding script. The function returns a PRE instance with Status="Waiting" that was initialized with the event data and according to the Script. Note also that the columns in Hash, Status and Wakeup in the table are not set in the insert statement—they are byproduct of modifying the PRE. This statement can possibly result in thousands of new instances inserted—all in a single scan of the Event table and inserting on the clustered index on the Pattern table.

Alternatively, if the event type is not Activating, all the events are merged into the corresponding patterns with statement like:

```
UPDATE Patterns SET PRE.OnEvent(Event,Script)
FROM Patterns WITH(INDEX(Join_Index))
JOIN Events ON Patterns.Hash=Events.Hash
WHERE PatternType=@PatterType AND EventType=@EventType
```

Here SQL statement will first estimate the most efficient type of Join. For example when the both tables are huge, this will be Merge-Join, because we are using the same type of index including Hash. Behind the scenes the SQL server will:

(a) Retrieve from the disk all sectors that contain patterns relevant to some events;

(b) Deserialize the PRE instance which is part of the record;

(c) Call its method OnEvent by passing the Event UDT;

(d) Ask PRE for the promoted properties Status and Wakeup, as well as Hash;

(e) Serialize the modified PRE back into the record;

(f) Write the sectors to the disk.

Note that here the Hash is used just as heuristics—there is small probability that the PRE will ignore the event—e.g. on hash collision but different SessionID-s. Also, there may be cases in which more than one Hash column is needed—for example two separate Hash columns for will be needed for patterns like:

e1 and then e2 and then e3 where e2.x=e1.x and e3.y=e2.y

For such patterns, each the merge logic will also use different type of join for each event type—e.g. join on x for e2 and join on y for e3. This means also that two pattern types can share the table only if they have the same number of joins.

In summary, this is a single UPDATE statement which will possibly modify thousands out of millions patterns. Some of those patterns may change their status. For example the status will change from "Waiting" to "NoMatch" if the "Pay" event was merged into PRE. The next challenge is how to change the status of the patterns when the change is due to not seeing any events in the given timeout. This timeout-evaluation is achieved with another bulk-operation on the Patterns table, with SQL statement like:

```
UPDATE Patterns SET PRE.OnWakeup( )
WHERE PatternType=@PatternType AND Wakeup<@Now
FROM Patterns WITH(INDEX(Wakeup_Index))
```

Note that this operation uses the Wakeup_Index and thus only the disk sectors containing patterns that have reached timeout are retrieved and updated. There is no chance of Deadlock because this operation is localized to the part of the table for the specific Pattern Type and is not performed simultaneously with the Merge for this Pattern Type.

Finally, the patterns that have matched are bulk-moved to another table with statements like:

```
INSERT MatchedPatterns
SELECT Patterns WITH(INDEX(Status_Index))
WHERE PatterType=@PatternType AND Status=Match
    DELETE FROM Patterns WITH(INDEX(Status_Index))
    WHERE PatterType=@PatternType AND Status>Waiting
```

The last statement assumes for example that Waiting is 0 and Match and NoMatch are >0. As side effect the patterns that are "NoMatch" are also deleted from the pattern table without being moved anywhere. But, this was the idea—to weed-out the unnecessary events and output only the really useful ones.

Now that we have described the core idea of the correlation into patterns, lets step back and look to what shall we do next with this data. There are clearly two very different scenarios:

Send the Matched Patterns into Subscription/Routing mechanism such as business activity software applications, etc. This way the people or systems interested in the pattern will get notified and can do the corresponding action (e.g. activate Workflow for "Possible ATM Fraud").

Just have the data available for Queries and Analysis in the usual SQL/OLAP/BAM sense. This has two sub-variations:

Query-ability and Analysis of the Matched patterns only—e.g. what are the reasons people are leaving the sopping cart (is it the shipping price? In which state/city this problem is causing us the most business losses?)

Query-ability and Analysis of all instances of the pattern, including the ones not yet complete. This is especially critical for long-running patterns, such as observations about business activities. For example if we have a business that deals with Shipments, it is critical to be able to query or get aggregations about the progress of the Shipments that are not yet complete. (Imagine trucks carrying items marked with RFID tags for example).

From those options, 1) is the easiest—just get the matched patterns and send them as "Events" to the consumers or for further pattern evaluation. Option 2b is the most complex one, because our data so far was encapsulated inside the PRE binary blob. FIG. 5. shows how this data is exposed for Query-ability. Here the definition of the table is changed like:

```
create table Patters_ShoppingCart
(
Hash as PRE.GetHash(0) persisted, -- promoted from the PRE
PRE as PatternRecognitionEngine, -- this is UDT registered before
Status as PRE.Status persisted, -- promoted from the PRE
Wakeup as PRE.Wakeup persisted -- promoted from the PRE
Login as PRE.GetDataItem("LoginTime"),
Checkout as PRE.GetDataItem("CheckoutTime"),
ShipType as PRE.GetDataItem("ShipmentType")
)
```

Here all the columns needed for Query and Analysis are promoted as actual SQL columns. Promoting them from the UDT will have a little overhead on the CPU but there will be no additional Disk IO. In addition, some of the columns may be marked as "persisted" and even used for indexes to speed up the queries.

Note that when the Query-ability is needed it becomes impossible to reuse the same table for many pattern instances—on the contrary the table itself is dedicated for specific pattern type, does not have "PatternType" column, and is dynamically created based on the pattern definition.

What is claimed is:

1. A computerized method for identifying a pattern from event streams, said method comprising:

compiling a pattern description, said pattern description defining a series of a first event and a second event, said second event relating to the first event, said first event and the second event having yet to be received;

defining a first script having type, time and substance parameters of the second event as a function of the parameters of the first event according to the pattern description;

receiving the first event, said first event including a type parameter data, a time parameter data, and a substance parameter data;

attaching the first script to the first event, said first script defining executable codes for handling and locating the second event by defining a reaction on an individual event type that may occur in the second event based on the complied pattern description;

executing the attached first script of the first event in real-time as the first event is received; and identifying the second event after the receiving of the first event, wherein said executed script identifies the received second event based on the defined type, time and substance parameters and thereby identifies the pattern.

2. The method of claim 1 wherein executing comprises correlating parameters in the received second event to the first event to determine if the received second event belongs to the defined series according to the pattern description.

3. The method of claim 1 wherein executing comprises outputting the parameter data of the first event and data relating to the identified pattern to a computing environment for analysis of the parameter data and the data relating to the identified pattern.

4. The method of claim 1 wherein attaching the first script to the first event comprises defining type, time, and substance parameters of the received second event by comparing the related type, time, and substance parameters of the second event to the type, time, and substance parameters of the first event.

5. The method of claim 1 further comprising storing the identified pattern in a data structure for analysis.

6. The method of claim 1 further comprising creating a copy of the defined series in response to the compiled pattern description and the attached script to the first events when one or more of the parameter data of the first event relate to one or more parameter data of the received second event or additional events in the series according to the compiled pattern description.

7. The method of claim 1 wherein said pattern description defines the series of the received first event, the received second event and a third event relating to the first and the second events, wherein the third event is received after receiving the first and second events, and wherein attaching comprises attaching a second script to the received second event, said second script defining type, time and substance parameters of the third event as a function of the parameters of the second event according to the pattern description and wherein executing comprises executing the attached second script of the second event, said executed script identifying the third event upon receiving the third event and thereby identifying the pattern.

8. The method of claim 1 wherein one or more computer-readable media have computer-executable instructions for performing the method recited in claim 1.

9. One or more computer-readable media having computer-executable components for identifying event patterns, said computer-executable components comprising:

a pattern compiling component for compiling a plurality of pattern descriptions, said each of the pattern descriptions defining a series of events in a sequence, said defined series of events having yet to be received;

an event component for collecting a plurality of events, said each of the plurality of events having data parameters relating to each of the plurality of events, said plurality of events to be received sequentially;

a script component for associating a script to each of the plurality of events, said script defining executable codes for handling a subsequent event by defining an operation occurring in the second event based on the complied pattern description, said script defining data parameters of the subsequent event in the series of each of the plurality of events according to the pattern description of each of the plurality of events; and a pattern recognition engine for executing the script of each of the plurality of events in real-time when a first event is received to identify the subsequent event in the series in real-time relative to the sequential receipt of the plurality of events and thereby identify the pattern in real-time.

10. The computer-readable media of claim 9 wherein the pattern description includes one or more of the following parts: pattern name, event reference, event filtering, event sequence, event timeout expectations, event correlation, and output results.

11. The computer-readable media of claim 9 wherein the pattern recognition engine correlates data parameters in the second event to the first event to determine if the second event belongs to the defined series according to the pattern description defined by the pattern compiler.

12. The computer-readable media of claim 9 further comprising a host environment for managing the pattern recognition engine, said host environment includes at least one of the following: an in-memory host environment, a file-based host environment, and a SQL-based host environment.

13. The computer-readable media of claim 12 wherein the pattern recognition engine outputs the parameter data of each of the plurality of events and data relating to the identified pattern to the host environment for further processing of the parameter data and data relating to the identified pattern.

14. The computer-readable media of claim 12 wherein the SQL-based host environment stores parameter data of each of the plurality of events and data relating to the identified pattern outputted by the pattern recognition engine in a database and receives a query from a user for retrieving the stored data in the database.

15. The computer-readable media of claim 9 wherein the pattern recognition engine further creates a copy of the defined series in response to the pattern description compiled by the pattern compiling component and the script attached by the script component to the events in the defined series when one or more of the parameter data of the event relate to one or more parameter data of additional events in the defined series.

16. A system for identifying a pattern in a plurality of events, said system comprising:

a plurality of collecting computers for collecting related events;

a first set of computers for identifying a first portion of each collected series as the first portion of events is collected, wherein each of the collected series matches the first portion of a series of pattern events, the first portion having attached script defining executable codes for handling a second portion of each series by defining an operation occurring in the second portion based on the complied pattern description;

a second set of computers for identifying the second portion of each series as the second portion of events is collected, wherein the first portion of the pattern has been identified by the first set and wherein the attached script is executed in real-time when the first portion has been identified to indicate that the second portion is to be expected before the second portion of events is collected; and wherein the first portion of the pattern and the second portion of the pattern match the series of pattern events and wherein each series of events including the first and second portions of the pattern is accumulated and stored for evaluation.

17. The system of claim 16 further comprising an interface for receiving a query from a user for retrieving accumulated and stored pattern in response to the query.

18. The system of claim 16 wherein the first set of computers and the second set of computers include pattern recognition engines for correlating the identified first portion of the pattern and the identified second portion of the pattern.

19. The system of claim 16 wherein the first set of computers and the second set of computers store a plurality of pattern descriptions, each of the plurality of pattern descriptions corresponds to each of the series of pattern events.

20. The system of claim 16 wherein the second set of computer servers creates a copy of each of the collected series in response to a pattern description and an attached script to the events collected in the series when one or more of the parameter data of the events identified in the first portion of the series by the first set of computer servers relate to one or more parameter data of the events identified in the second portion of the series by the second set of computer servers.

* * * * *

UNITED STATES PATENT AND TRADEMARK OFFICE
CERTIFICATE OF CORRECTION

PATENT NO. : 7,627,544 B2 Page 1 of 1
APPLICATION NO. : 11/133701
DATED : December 1, 2009
INVENTOR(S) : Chkodrov et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 223 days.

Signed and Sealed this

Twenty-first Day of December, 2010

David J. Kappos
*Director of the United States Patent and Trademark Office*